United States Patent [19]

Salgado et al.

[11] Patent Number: 4,782,816

[45] Date of Patent: Nov. 8, 1988

[54] APPARATUS FOR A SOLAR WATER HEATER

[76] Inventors: Angel M. Salgado, 6060 W. Royal Palm Rd., Glendale, Ariz. 85302; Harold L. Drury, 3852 W. Dalphin Rd., Phoenix, Ariz. 85021

[21] Appl. No.: 932,938

[22] Filed: Nov. 20, 1986

[51] Int. Cl.⁴ .............................................. F24J 2/04
[52] U.S. Cl. .................................. 126/437; 126/432; 126/443; 126/450
[58] Field of Search ............... 126/415, 417, 437, 443, 126/432, 450; 415/DIG. 8

[56] References Cited

U.S. PATENT DOCUMENTS

| | | | |
|---|---|---|---|
| 3,436,908 | 4/1969 | Van Delil | 126/432 X |
| 3,943,911 | 3/1976 | Yu | 126/432 X |
| 3,949,732 | 4/1976 | Reines | 126/432 X |
| 4,003,365 | 1/1977 | Wiegand et al. | 126/432 X |
| 4,111,187 | 9/1978 | Wiegand | 126/432 |
| 4,256,090 | 3/1981 | Imperiale | 126/437 X |
| 4,294,228 | 10/1981 | Kruger et al. | 126/437 X |
| 4,316,450 | 2/1982 | Sumos et al. | 126/432 |
| 4,331,042 | 5/1982 | Anderson | 415/DIG. 8 X |
| 4,541,416 | 9/1985 | Leininger et al. | 126/432 X |

Primary Examiner—Randall L. Green
Attorney, Agent, or Firm—William W. Holloway

[57] ABSTRACT

A solar water heater has a basin or reservoir for collection and storage of heated water, a generally pyramidal or prism shaped structure for absorbing solar radiation, a transparent pyramidal or prism shaped structure for enclosing and thermally isolating the reservoir and radiation absorbing element, a pump and associated apparatus for projecting the water against heat absorbing structure and a valve for controlling the flow of heated water from the reservoir. The heat absorbing structure and the enclosing structure are comprised of a multiplicity of planar elements that can be disassembled for transport or for storage. The power consumption from external sources for operating the solar heating device can be reduced by providing a battery and by using air, expanded through the process of heating the water, to drive an electrical generator, the generator charging the battery.

8 Claims, 1 Drawing Sheet

U.S. Patent
Nov. 8, 1988
4,782,816
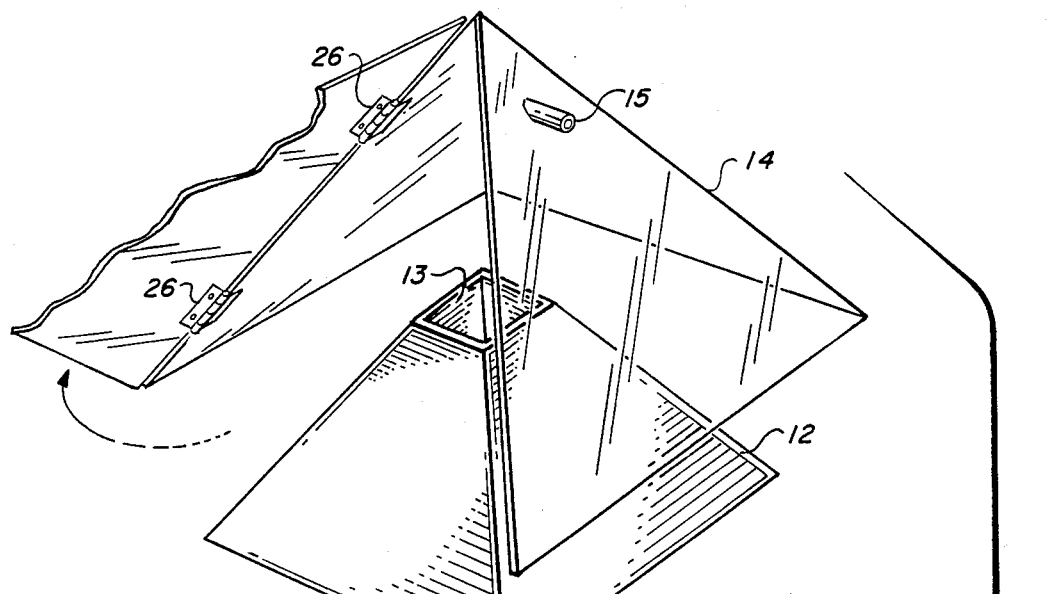
FIG. I.
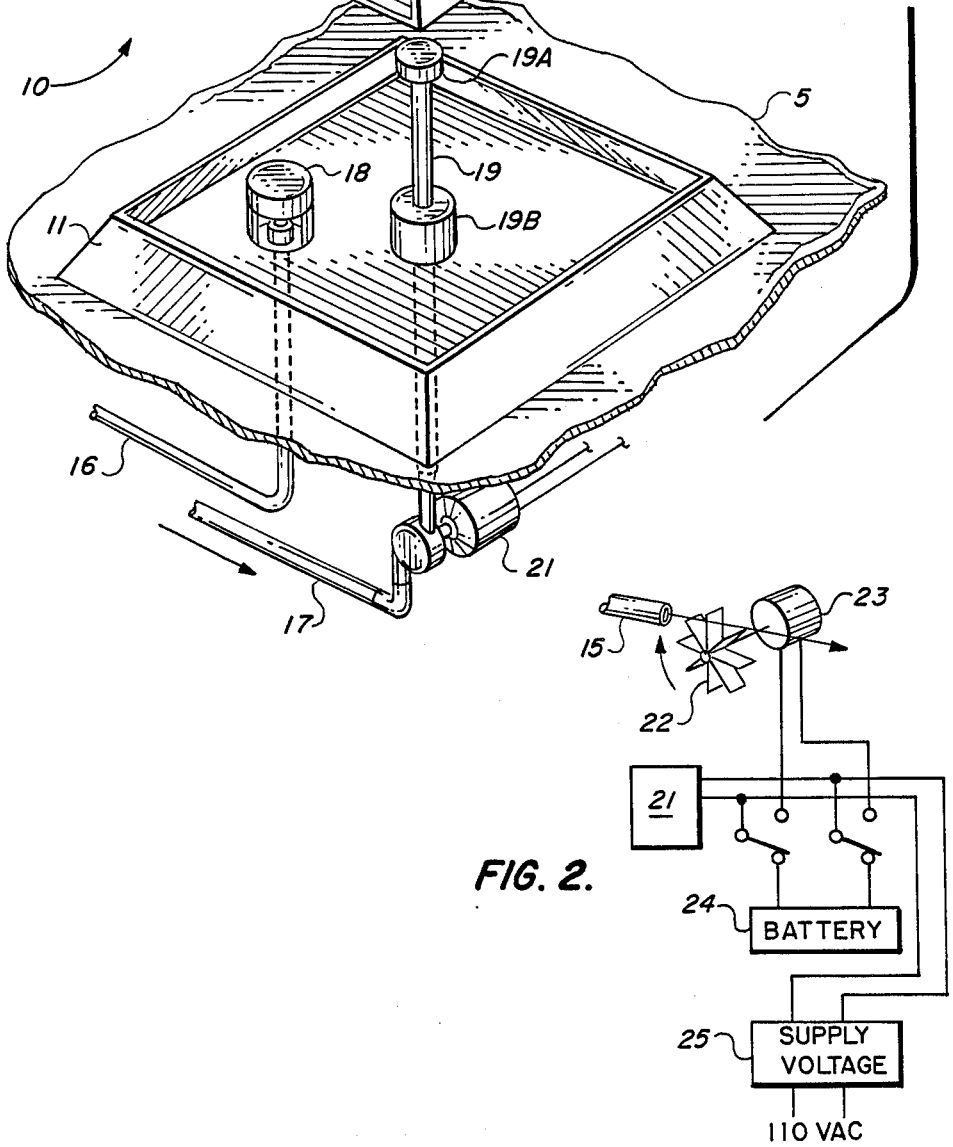
FIG. 2.

APPARATUS FOR A SOLAR WATER HEATER

BACKGROUND OF THE INVENTION

1. Field of the Invention

This invention relates generally to the heating of water by solar radiation and, more particularly, to a solar water heating device that is relatively compact and can be made easily transportable.

2. Description of the Related Art

The heating of water by solar radiation for relatively small applications, such as heating of family pools or providing warm or hot water at remote (cabin) locations, has typically involved coupling of water conduits to panels adapted and positioned to absorb solar radiation. The solar panels can be large, limiting mobility of the panels and limiting the possible locations with suitable panel orientation with respect to the sun. This length of the conduits and the possible distance of the solar panels from the location requiring the heated water can result in a requirement for a large pump in order to move the water through the heating system. When an attempt is made to increase the dimensions of the solar heating device to provide a larger water heating capacity, the problems can be amplified.

A need has therefore been felt for a solar water heater that is relatively compact and that can be conveniently scaled upward in size for applications requiring larger amounts of water.

FEATURES OF THE INVENTION

It is an object of the present invention to provide an improved solar water heating apparatus.

It is a feature of the present invention to provide a solar water heating apparatus that is relatively compact and portable.

It is yet another feature of the present invention to provide a water heating apparatus to which a device can be added for reducing the power consumed in energizing the solar heater.

It is yet another feature of the present invention that the bulk components are comprised of flat panels that can be disassembled for convenient transportation.

SUMMARY OF THE INVENTION

The aforementioned and other features are obtained, according to the present invention, by providing a generally pyramidially shaped structure for absorbing solar radiation. Water is sprayed on the absorbing structure and heat is transferred thereto. The heated water flows into a storage reservoir where it can be released as required. A radiation transmitting structure encloses the reservoir and the radiation absorbing structure and permits the transfer of radiation to the heat absorbing element while reducing the loss of heat to the ambient air mass. Apparatus can be added that minimizes the power required to activate the solar heater. Mirrors can be added to increase the collecting power of the solar heater.

These and other features of the present invention will be understood upon reading of the following description along with the drawings.

BRIEF DESCRIPTION OF THE DRAWINGS

FIG. 1 is an exploded view of the solar heating device of the present invention.

FIG. 2 is a diagram of the apparatus for reducing the power consumption of the solar heating apparatus of the present invention.

DESCRIPTION OF THE PREFERRED EMBODIMENT

1. Detailed Description of the Figures

Referring to FIG. 1, an exploded view of the solar heater 10 of the present invention is shown. Structurally, the solar heater 10 has three major components, a reservoir or basin 11, a radiation absorbing structure 12 and a transparent enclosing or cover structure 14. The reservoir and the enclosing structure rest on a base 5 when the solar heater is operational. The solar radiation passes through the enclosing structure 14 and heats the radiation absorbing structure 12. Water is applied to the radiation absorbing structure 12, absorbs heat therefrom, and flows into the reservoir 11. Flow of the water from the reservoir 11 via exit conduit 16 is controlled by a valve 18. In the preferred embodiment, the valve 18 is a float valve with provision for a small continuous flow of heated water to prevent cooling of conduit 16 while maintaining the reservoir in a generally filled condition. The flow of water through the exit conduit 16 is induced by gravity in the preferred embodiment. However, a pump can be required if the location of the solar heater is higher than the location receiving the heated water. The water is introduced into solar heater 10 via entrance conduit 17, the flow being controlled by pump 21. The water from the entrance conduit 17 is forced into water distribution element 19. Water distribution element 19 includes a prewarming portion 19B that is physically located within the reservoir 11 and is in good thermal contact with heated water in the reservoir 11. The incoming water flow is therefore preheated. Water distribution element 19 includes spray element 19A that sprays the incoming water against the surface of heat absorbing element 12. The heat absorbing structure 12 has an aperture 13 formed therein to provide a means of mixing the atmosphere of the interior of structure 12 with the atmosphere of exterior to structure 12, but still enclosed by structure 14. A cap can be coupled to spray element 19A to minimize water spray from passing through aperture 13 and impinging on the enclosing structure 14. An orifice 15 can be formed in the enclosing element 14. A shelf can be formed on the bottom of enclosing structure 14. Mirrors for augmenting the radiation impinging on the radiation absorbing structure 12 can be positioned between the radiation absorbing structure 12 and the walls of reservoir 11. In the preferred embodiment, the walls of reservoir 11 are more vertical than illustrated in FIG. 1 and a suitably sized mirror can have the upper edge of the mirror resting against the walls of reservoir 11 with the lower edge wedged against the bottom of the radiation absorbing element 12.

Referring next to FIG. 2, apparatus for reducing the power required to operate the solar heating apparatus is shown. The pump 21 can, in the absence of the auxiliary apparatus be activated by a supply voltage unit 25 that provides an appropriate pump energizing voltage in response to electrical coupling to the typical power outlet. Similarly, for remote locations, the pump 21 can be energized by coupling to a battery 24.

In the present invention, when the water is pumped into the solar heater and warmed, air can be forced out through the orifice 15. This motion of the air can force flywheel 22 to rotate. The flywheel 22 is coupled to generator 23 and the rotation of the flywheel causes generator 23 to provide a voltage at the generator output terminals, charging the battery 24. Various functional components such as devices to control activation of pump 21 or rectifier components to prevent discharge of the battery are not shown, but the function and position in the circuit will be apparent to one skilled in the art.

2. Operation of the Preferred Embodiment

Referring once again to FIG. 1, the basin or reservoir 11 is, in the preferred embodiment, in the shape of bottom portion of a pyramid. The radiation absorbing structure 12 can fit into this reservoir 11 and rest on the base of reservoir 11. Any water in the reservoir will thus be in good thermal contact with the heat absorbing structure 12. The radiation absorbing structure 12 is in the shape of a pyramid with an aperture (13) formed therein. The enclosing structure 14 is also in the shape of a pyramid and is fabricated in such a manner as to rest against the walls of reservoir 11 and form a relatively air-tight interior region. This structure reduces the exchange of heat with the exterior environment by convection.

As indicated by the Figures and the foregoing discussion, the preferred embodiment contemplates the use of pyramidal forms as the basic structure for the radiation absorbing structure and the enclosing structure. Indeed, the panels, in the preferred embodiment are typically equilateral triangles. However, departures from this structure are possible without compromising the performance of the structure. Furthermore, the pyramid form can be replaced by a prism form, including prism forms that are not symmetrical. Although the invention has been described in terms of the heating of water, it will be clear that any fluid material can be heated by this technique.

In the preferred embodiment, the radiation absorbing structure 12 is fabricated from stainless steel. This material is chosen for application of the invention in the swimming pool environment where corrosive chemical additives can be present. However, other materials that permit the absorption of radiation by the structure and the efficient transfer of the heat resulting from that absorption to water flowing on the opposite surface can be utilized. As will be apparent from inspection of FIG. 1, the potentially bulkiest components of the solar heater, the heat absorbing structure 12 and the enclosing structure 14 are comprised of planar elements. These elements can be coupled in such a manner that the components can be disassembled into the planar elements for convenient storage or transportation. For example, the enclosing element can have fasteners and-/or hinges (shown as structures 26 in FIG. 1) along the element edges to couple the panel edges together. In addition, the panel edges can have a compressible material applied thereto to provide a more acceptable seal.

The use of the battery charging apparatus of FIG. 2 is particularly advantageous in remote locations where no power source may be commercially available. The charge of the battery can be maintained for a longer period of time.

A further advantage of the present invention is the relatively compact structure lends itself to locations for which the typical solar panels may not be appropriate. The upright aspect of the radiation absorbing structure provides a more flexible technique for intercepting solar radiation as compared to the typical solar panels. With the solar panel devices concern must be directed to the (changing) direction of solar radiation, a problem that is less severe with the upright and relatively omni-directional nature of the solar heater of the present invention. The dimensions of the solar heater of the present invention can be altered relatively easily, the larger dimensioned solar heater being capable of increased capacity.

The foregoing description is included to describe the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A solar fluid heater comprising:
   a base structure adapted to form a reservoir for storing said fluid;
   a radiation absorbing structure detachable from and adapted to be positioned within said reservoir and be in contact with fluid stored in said reservoir, said radiation absorbing structure having planar elements coupled in a pyramidal shape;
   fluid distribution means for applying said fluid to said radiation absorbing structure, said applied fluid flowing into said base structure; and
   an enclosing structure having planar elements generally having said pyramidal shape for contacting said base structure and thermally isolating said radiation absorbing element and said stored fluid from an exterior environment.

2. The solar fluid heater of claim 1 further comprising a valve in said base structure for controllably releasing water from said base structure.

3. The solar fluid heater of claim 1 wherein said radiation absorbing structure and said enclosing structure are generally shaped in the form of an irregularly shaped pyramidal structure a prism.

4. The solar fluid heater of claim 1 wherein said fluid distribution means includes a pump operated by a battery, said solar fluid heater further including charging means for charging said battery during operation of said solar heater.

5. The solar fluid heater of claim 2 wherein said valve is a float valve adapted to maintain a predetermined level of fluid in said base structure.

6. The solar fluid heater of claim 1 wherein said planar elements can be disassembled.

7. The solar fluid heater of claim 1 wherein said fluid distribution means is thermally coupled to water stored in said reservoir, said thermal coupling preheats said applied fluid.

8. A heater for fluids using solar radiation as an energy source comprising:
   a reservoir structure for storing fluid;
   a generally prism shaped structure constructed of planar elements and adapted to be removably positioned in said reservoir structure, said prism shaped structure adapted to absorb solar radiation, said prism shaped structure being in contact with said fluid stored in said reservoir structure;
   an enclosing structure adapted to isolate thermally said prism shaped structure and said stored reservoir fluid, said enclosing structure fabricated from a material transmitting a substantial portion of impinging solar radiation; and
   water distribution means for applying said fluid to said prism shaped structure planar elements, said fluid receiving heat therefrom while flowing on surfaces of said planar elements under the force of gravity, said prism shaped structure being heated in response to said impinging solar radiation.

* * * * *